United States Patent
Monahan et al.

(10) Patent No.: US 11,063,756 B1
(45) Date of Patent: Jul. 13, 2021

(54) SECURE INTRA-CHIP HARDWARE MICRO-SEGMENTATION USING CHARGED PARTICLE BEAM PROCESSING

(71) Applicant: Multibeam Corporation, Santa Clara, CA (US)

(72) Inventors: Kevin M. Monahan, Cupertino, CA (US); David K. Lam, Saratoga, CA (US); Theodore A. Prescop, San Jose, CA (US)

(*) Notice: Subject to any disclaimer, the term of this patent is extended or adjusted under 35 U.S.C. 154(b) by 76 days.

(21) Appl. No.: 16/660,256

(22) Filed: Oct. 22, 2019

Related U.S. Application Data

(63) Continuation of application No. 15/711,891, filed on Sep. 21, 2017, now Pat. No. 10,523,433.

(60) Provisional application No. 62/431,905, filed on Dec. 9, 2016.

(51) Int. Cl.
*G06F 21/00* (2013.01)
*H04L 9/08* (2006.01)
*H04L 9/30* (2006.01)

(52) U.S. Cl.
CPC .......... *H04L 9/088* (2013.01); *H04L 9/30* (2013.01)

(58) Field of Classification Search
CPC ... H04L 9/088; H04L 9/08; H04L 9/30; G06F 21/86; G06F 21/87; G06F 21/73
USPC ........................................................ 713/194
See application file for complete search history.

(56) References Cited

U.S. PATENT DOCUMENTS

| | | | | |
|---|---|---|---|---|
| 7,316,934 B2* | 1/2008 | Mangell | ............ | G03F 1/00 438/7 |
| 8,832,465 B2* | 9/2014 | Gulati | ............ | G06F 21/575 713/192 |
| 2007/0111360 A1* | 5/2007 | Frey | ............ | B81B 3/0072 438/48 |
| 2016/0066789 A1* | 3/2016 | Rogers | ............ | A61N 1/05 604/20 |

* cited by examiner

*Primary Examiner* — Longbit Chai
(74) *Attorney, Agent, or Firm* — Seth A. Horwitz; Carrington, Coleman, Sloman & Blumenthal, L.L.P.

(57) ABSTRACT

Methods, systems and devices for using different encryption keys written into interconnects of different functional blocks in different integrated circuits to securely encrypt and authenticate firmware, data, instructions and other messages transmitted among said functional blocks; and methods, systems and devices to obfuscate encryption keys to significantly increase the time and resources required to compromise those keys, ensuring encrypted data is only decrypted by authorized functional blocks, applications or users. Unique keys, small enough not to impact substrate surface area available for other device functions, can be written by charged particle beams such that multiple (or each of) functional blocks has a corresponding key unique within an IC and across a line of ICs and so that access to said keys is as limited (or nonexistent) as desired. Circuits embodying key bits can also be distributed throughout ICs and across layers, uniquely to individual functional blocks in individual ICs, to obfuscate patterns implementing keys and thereby raising time and resource cost to reverse engineer keys to prohibitive levels.

19 Claims, 10 Drawing Sheets

SECURE INTRA-CHIP HARDWARE MICRO-SEGMENTATION USING CHARGED PARTICLE BEAM PROCESSING

CROSS-REFERENCE

This application claims priority as follows: this application is a non-provisional of U.S. Provisional Pat. App. No. 62/431,905, filed Dec. 9, 2016, which is incorporated herein by reference.

BACKGROUND

The present application relates to systems, devices and methods for implementing hardware-based security by using charged particle beam tools to differently write different encryption keys to different integrated circuits (ICs); and more particularly to writing in interconnects one or more unique encryption keys per one or more cores in ICs, and obfuscating locations of interconnects and related circuits used to implement individual bits of encryption keys and other IC-specific data within individual ICs and across runs of same-design ICs.

Note that the points discussed below may reflect the hindsight gained from the disclosed inventions, and are not necessarily admitted to be prior art.

Security software plays important roles defending against device hacking and cyber intrusion. Software has been deployed at multiple levels of communication networks to secure data centers ("the cloud"), Internet links, gateways, and individual devices. Antivirus, anti-malware, and firewall software also provide some protection against cyberattacks. However, networks and devices are safe only until attackers find ways around the defense.

The strength of encryption systems used to protect electronics systems, networks, and infrastructure depends on unique, unpredictable keys. Reliance on user-generated passwords (which are typically neither unique nor unpredictable) or on cryptographic keys generated by software (which might be subverted, sidestepped, or compromised) has not prevented wide-scale data theft, eavesdropping, hijacking of systems (e.g., "ransomware"), and other "cyber" crime. Use of compromised non-traditional internet-connected computing platforms (which typically are produced with minimal security)—the "Internet of Things" (TOT)—as attack vectors poses a large-scale threat to connected infrastructure, and emphasizes the need for effective and ubiquitous security implementation.

Software coding errors, bugs, design errors, unforeseen code interactions, and other software flaws are both typical and often give rise to significant vulnerabilities. Vulnerabilities are also frequently introduced deliberately, e.g., "backdoors" required by software providers to access users' software for updates, bug fixes, debugging, and other useful or valuable (or other) purposes. Finding or effectively obfuscating such vulnerabilities is generally expensive and time consuming, and therefore generally more difficult to perform effectively for an individual (thus, limited) entity than for the widely distributed community of entities with interests opposed to strong security (e.g., overtly criminal entities, adverse nation-state-sponsored actors, and other "black hats").

Hardware-embedded security can be used to fortify cyber defense and avoid or remedy many of the problems with software-based security. Hardware-embedded security can be implemented using integrated circuit (IC) personalization to physically instantiate chip-specific (unique) and unpredictable security keys. However, most ICs are patterned using optical lithography, which is not generally conducive to per-IC customizable design.

In optical lithography, patterning a circuit layer is done through a photomask (mask) in cookie-cutter fashion. Chips patterned using the same mask set are identical. This is a big benefit in volume production. However, a mask set generally costs weeks and millions of dollars to manufacture, and the design layout expressed through the mask is static, not intrinsically enabling embedding chip-specific information during fabrication.

Because photo-mask information is fixed, all chips of a given design on a wafer receive the same pattern from optical lithography. Commercial-scale batches of ICs are generally produced such that most or all ICs in the batch are effectively identical to one or more (frequently all) other ICs in the batch at the time when IC fabrication is completed. IC personalization for security generally either happens after fabrication, or not at all.

Hardware solutions for IC personalization include fuse-programmable integrated circuits, antifuses, Flash memory and physically unclonable functions ("PUFs"). These approaches do not embed chip-specific information in interconnects within the IC.

Generally, in the fuse-programmable integrated circuit approach, after ICs are produced, encrypted information is written on each individual IC to enhance security. But the fusing operation is typically outsourced and the data to be written is exposed to potential access by, or through vulnerabilities in the systems and operations of, the third party performing the fusing operation (typically the post-fabrication test operator). As a result, trust and security can be compromised. (Third party security issues can be avoided in the case of integrated device manufacturers ("IDMs"), where all steps from design to fabrication (fab) to test to packaging are performed and controlled by the IDM; but IDMs tend to be a minority of device producers.) Apple's Secure Enclave is an example of a fuse-programmable approach to hardware-embedded information unique to each IC, and is disclosed in U.S. Pat. No. 8,832,465, which is incorporated herein by reference.

Antifuses are programmed by selectively inducing short circuits between metal interconnect layers in a chip. Antifuses are typically buried under several metal layers and therefore generally have better physical security than eFuses. However, antifuses tend to be easily identifiable after chip package removal due to their grid-like layout and the large nearby driver circuits used for programming the antifuses. The programming is typically done outside the fab by a third party, similar to fuse-programmable ICs. Also, antifuses generally require custom fab processing.

Though Flash memories are often described or advertised as non-volatile, Flash memories generally have data retention times of about five to ten years (or less). This may be acceptable for fleeting consumer products, but it is likely inadequate for some types of IoT (Internet of Things) or PLC (Programmable Logic Controller) devices that are connected to or are integral parts of critical infrastructure. Data in Flash is also generally visible external to the IC on which it is written, making the data vulnerable to external access and/or manipulation.

A physical unclonable function (PUF) establishes a data string which depends upon partially random physical characteristics of an IC. The physical characteristics are caused by variations during the manufacturing of the IC. Process variations during IC manufacturing are both unavoidable and difficult to reproduce. Thus, in principal, PUFs can be used to establish unique, unreproducible data strings for each IC. However, the contents of a PUF cannot be predetermined, and PUF responses are somewhat noisy. Furthermore, PUF responses may change with temperature or time, or may be read from, or derived from, memory. An example of a PUF is a volatile memory which at power-up has contents that depend on the partially random physical characteristics of the memory. Manufacturing variations lead to different physical characteristics for different memories. See, e.g., U.S. Pat. App. Publ. 20140325237, which is incorporated herein by reference.

Generally, previous hardware-related security efforts have focused on chip-to-chip security protocols that involve hardware and/or software segmentation (compartmentalizing security of individual or groups of ICs with respect to other individual or groups of ICs) that protects chips interfacing with an external bus or other inter-device communications architecture. Such segmentation has typically involved splitting individual or groups of (for example) different devices, computer network portions or layers, or memories or memory contents or memory address spaces, into separate segments each able to have its own set of access permissions.

SUMMARY

The inventors have discovered that using charged particle beams to securely write IC-specific data into device interconnects enables the security of said IC-specific data embodied in interconnect patterns—such as embedded cryptographic keys—to be improved by obfuscating locations of said interconnect patterns to defend against attempts by unauthorized parties to physically extract said IC-specific data. Obfuscation of IC-specific data (for example, as applied to cryptographic keys controlling access to IC function) can be performed by distributing and/or varying locations of key-embodying interconnects vertically (in different layers) or horizontally (in positions distributed around the IC); and/or by combining bits comprising keys to produce said key in IC-specific ways; and/or by making bits of keys appear to be other logical elements. Circuit obfuscation is straightforward to implement and low cost, and can be performed while avoiding changes to higher-level architectures; and elevates the time and resources required to reverse engineer the keys required to compromise IC function (or other IC-specific data), potentially to prohibitive levels.

The inventors also have discovered that charged particle beams can write, as non-volatile memory embodied in interconnects on ICs, encryption keys (1) long enough to usefully raise time and resource cost to compromise IC function, and (2) small enough that different functional blocks on an IC can store different corresponding keys with which to encrypt and decrypt instructions and other messages, (3) with different ICs (preferably, each different IC) having one or more encryption keys unique to that IC, and (4) without impacting semiconductor surface area available for other device functions.

In some embodiments, each functional block of each IC has a different corresponding encryption key or encryption/decryption key pair, and functional blocks of an IC store tables of the encryption and/or decryption keys (also written by charged particle beams) used to communicate with other functional blocks within the IC.

As a result, robust hardware-based segmentation can be implemented, compartmentalizing IC security, removing sensitive unencrypted information from IC busses, and minimizing IC attack surface.

Charged particle beams can be used to write unique interconnect-embodied encryption keys (and other IC-specific data) efficiently and in a manner that enables secure control over access (or denial of access) to those keys, resulting in a strong hardware-based root-of-trust (RoT).

BRIEF DESCRIPTION OF THE DRAWINGS

The disclosed inventions will be described with reference to the accompanying drawings, which show important sample embodiments and which are incorporated in the specification hereof by reference, wherein.

DETAILED DESCRIPTION OF SAMPLE EMBODIMENTS

Figure 1:
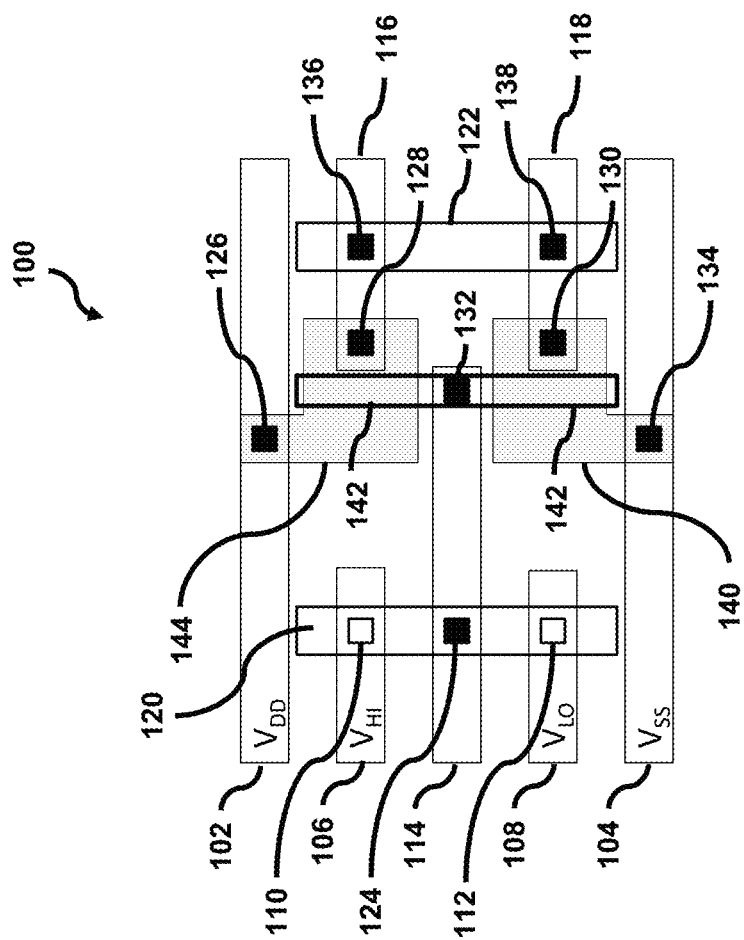
FIG. 1 schematically shows an example of a circuit that can be used to implement Secure Embedded Data using IC-specific locations written by a charged particle beam tool.

The numerous innovative teachings of the present application will be described with particular reference to presently preferred embodiments (by way of example, and not of limitation). The present application describes several inventions, and none of the statements below should be taken as limiting the claims generally.

The inventors have discovered that using charged particle beams to securely write IC-specific (integrated circuit-specific) data into device interconnects enables the security of said IC-specific data embodied in interconnect patterns—such as embedded cryptographic keys—to be improved by obfuscating locations of said interconnect patterns to defend against attempts by unauthorized parties to physically extract said IC-specific data. Obfuscation of IC-specific data (for example, as applied to cryptographic keys controlling access to IC function) can be performed by distributing and/or varying locations of key-embodying interconnects vertically (in different layers) or horizontally (in positions distributed around the IC); and/or by combining bits comprising keys to produce said key in IC-specific ways; and/or by making bits of keys appear to be other logical elements. Circuit obfuscation is straightforward to implement and low cost, and can be performed while avoiding changes to higher-level architectures; and elevates the time and resources required to reverse engineer the keys required to compromise IC function (or other IC-specific data), potentially to prohibitive levels.

The inventors have also discovered that charged particle beams can write, as non-volatile memory embodied in interconnects on ICs, encryption keys (1) long enough to usefully raise time and resource cost to compromise IC function, and (2) small enough that different functional blocks on an IC can store different corresponding keys with which to encrypt and decrypt instructions and other messages, (3) with different ICs (preferably, each different IC) having one or more encryption keys unique to that IC, and (4) without impacting semiconductor surface area available for other device functions.

In some embodiments, each functional block of each IC has a different corresponding encryption key or encryption/decryption key pair, and functional blocks of an IC store tables of the encryption and/or decryption keys (also written by charged particle beams) used to communicate with other functional blocks within the IC.

As a result, robust hardware-based segmentation can be implemented, compartmentalizing IC security, removing sensitive unencrypted information from IC busses, and minimizing IC attack surface.

Charged particle beams can be used to write unique interconnect-embodied encryption keys (and other IC-specific data) efficiently and in a manner that enables secure control over access (or denial of access) to those keys, significantly increasing the cost and resources required to compromise or alter those keys, ensuring encrypted data is only decrypted by authorized functional blocks, applications or users, and strengthening the root-of-trust (RoT) of the system.

The disclosed innovations, in various embodiments, provide one or more of at least the following advantages. However, not all of these advantages result from every one of the innovations disclosed, and this list of advantages does not limit the various claimed inventions.

Enables secure per-core (or per-processor) encryption-protected segmentation of ICs;
enhances IC security at a hardware (interconnect) level;
provides a strong hardware-based root-of-trust;
increases resource and time costs to compromise IC security at a hardware level;
increases resource and time costs to compromise IC security at a signal level;
eliminates or reduces vulnerable attack surfaces;
enables use of large numbers of long hardware-based encryption keys with minimal impact to design surface area budget for other IC functions;
and
enables ubiquitous encryption for messages transmitted across IC busses;
enables obfuscation of location, layer, and identity of circuits and IC-specific write locations used to instantiate IC-specific cryptographic keys and other IC-specific data, strengthening ICs against attempts to compromise secure data using decapsulation and physical inspection.

Some exemplary parameters will be given to illustrate the relations between these and other parameters. However it will be understood by a person of ordinary skill in the art that these values are merely illustrative, and will be modified by scaling of further device generations, and will be further modified to adapt to different materials or architectures if used.

The present application discloses methods, systems and devices for creating secure intra-chip hardware micro-segmentation using charged-particle beam processing.

Embodiments disclosed herein use micro-chip security embedded early in the IC manufacturing process, avoiding risks associated with relying on third parties that modify the chips further along in the distribution chain (e.g., to write data to fuses). Embodiments disclosed herein also avoid risks associated with software solutions (including segmentation solutions), such as vulnerabilities due to design oversights, accidental coding errors, or deliberately injected malware (hostile code). Embodiments disclosed herein use hardware-embedded encryption, decryption and authentication to enhance intra-device security. Hardware-embedded cryptographic processes are typically several hundred times faster than software-based cryptography, and corresponding structure, including embodiments disclosed herein, can be designed as synthesizable cores that can be instantiated within an IC design.

Figure 3:
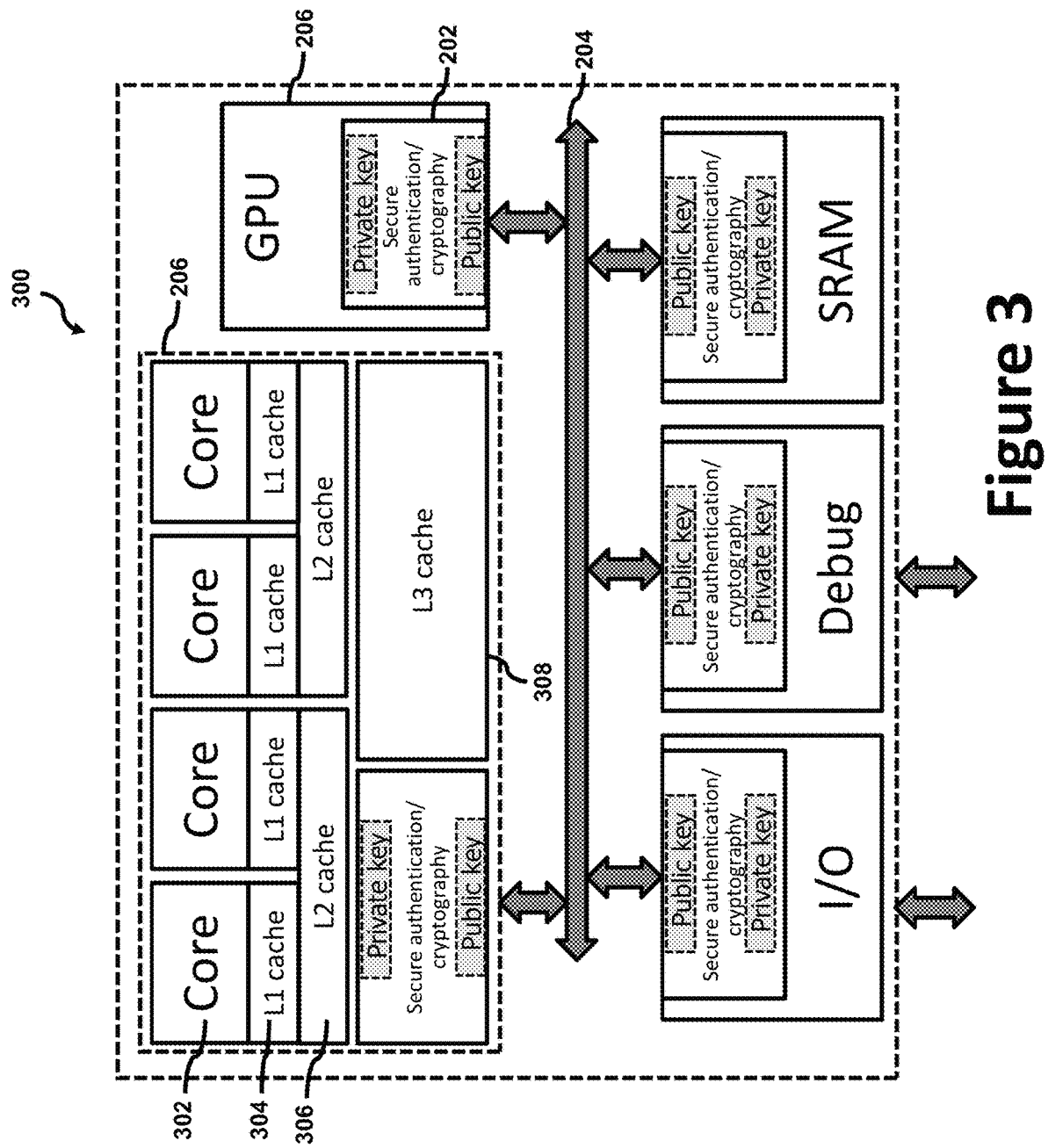
FIG. 3 schematically shows an example of an IC using secure hardware multi-core segmentation.
Figure 4:
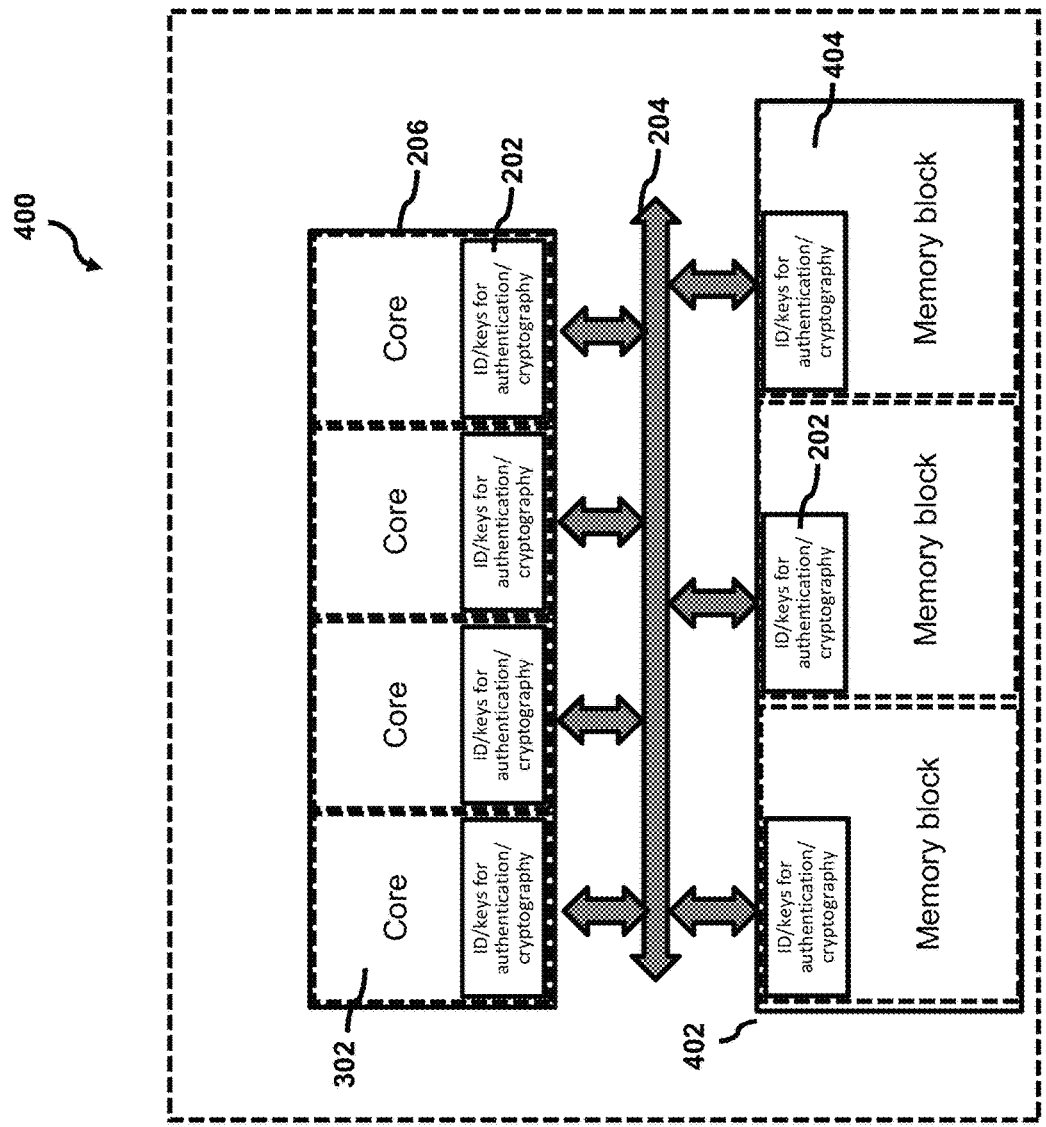
FIG. 4 schematically shows an example of an IC using secure hardware multi-core sub-segmentation.

Embodiments disclosed herein enable embedding security information (including keys or individual bits that make up a key) early in the layering process of IC manufacturing and distributing that information both vertically (e.g., among lower via and/or metal layers) and horizontally across a functional block (see FIG. 4). Hardware micro-segmentation, comprising controlled and encrypted communication between functional blocks (e.g., processors) within an SoC (System on a Chip), is enabled by embedding unique, unalterable security information (keys) within multiple (preferably, each) individual functional blocks; see FIGS. 1, 2 and 3. The combination of these technologies enables fabrication of devices with a strong hardware-based root-of-trust (RoT), upon which higher levels of security (e.g., software-based) can ultimately depend.

For example, embedded security information as disclosed herein can be used to protect a device from tampering; protect internal messaging in the device as it boots into a known, secure state; provide cryptographic keys used by the device at a hardware level to authenticate sources of device firmware and other software requesting execution on secured device hardware; and confirm that the firmware and other software has not been tampered with.

Commonly used SoC chips are frequently divided into "functional blocks" such as microprocessor units (MPUs), graphical processor units (GPUs), digital processor units (DPUs), cache memory units (CMUs) and input-output devices (IODs). Generally, if a functional block or other processing core (in an SoC, other IC, or other processing unit) is capable of running code, it has the potential to be hacked and can benefit from hardware-based security and secure intra-chip hardware micro-segmentation with embedded security protocols.

As used herein, "secure embedded data" (SED) refers to data written by one or more charged particle beams into interconnects in an IC. SED and methods for writing SED are disclosed by, for example, U.S. patent application Ser. No. 15/260,987, which is incorporated herein by reference. Methods, devices and systems for secure production of devices storing SED using encryption to protect IC-specific write locations within (and preferably beyond) the process pipeline are disclosed by, for example, U.S. patent application Ser. No. 15/293,090, which is incorporated herein by reference.

"Embedded" refers to the ability to write the secure data deep within the surface of the chip, e.g., in the Metal-1 or Via-1 layer, immediately after transistors are laid down. By placing features determining embedded secure data values deep within the IC surface, the cost, time and resources required to determine the embedded secure data values by physical examination of the packaged IC can be significantly increased.

"Secure" data refers both to the ability to securely write the data to the chip so that only selected parties—or no one at all (potentially ever)—knows the value(s) written (potentially with different circles of knowledge for different data values written to an IC); and to the ability to use the secure data (e.g., public/private key pairs) to substantially increase the time and resource cost to attack (hack) the chip in which the data is embedded and/or systems in which the chip is embedded. Secure data is chip-specific; preferably, every chip is different, meaning that successfully guessing the SED of a single chip (potentially enabling a hack) will generally confer no advantage in guessing the SED of another chip.

SED, securely written by one or more charged particle beams into ICs, can comprise unique or random codes written into IC areas isolated from busses (and, preferably, from Input/Output ports) but usable by selected embedded functional units, such as an encryption engine or a random number generator.

"Intra-chip hardware micro-segmentation" refers to use of encryption keys embedded within functional blocks on an IC to protect messages transmitted within an IC (e.g., passed between functional blocks on that IC).

"Secure" intra-chip hardware micro-segmentation uses encryption keys hardened against compromise by adverse actors (persons without authorization) with physical access to the IC package interior using, e.g., decapsulation (e.g., to inspect the IC to determine IC-specific write locations) or direct electrical access to device busses to discover key values dependent on data stored using IC-specific write locations. As further disclosed herein, encryption keys can be protected against unauthorized discovery by writing SED used to generate keys in unpredictable, and therefore obfuscated, locations on the IC; and by making details of generation of encryption keys using SED outputs dependent on further IC-specific write locations.

Secure intra-chip hardware micro-segmentation protects chips from hacking by increasing the time, cost, and expertise required for hacking to the point where the hack is either economically unjustified or (preferably) impossible (at least within useful timeframes, with high probability) using currently available computing technology.

Embodiments disclosed herein use one or more charged particle beam columns to pattern a substrate. Preferred embodiments use arrays of electrostatically controlled electron beam (e-beam) mini-columns. Charged particle beam columns can be configured to write and/or image features on substrates.

"Substrate" is defined herein as a workpiece having a composition and shape amenable to patterning and deposition of one or more layers of material thereupon using techniques applicable to semiconductor device fabrication, such that functional devices can be produced therefrom. For example, a semiconductor wafer is a substrate.

The "design layout database" is the database specifying physical layout to be patterned on the substrate (e.g., for electronic semiconductor devices, a database of electrical designs that have been rendered into physical layouts).

Fully automated charged particle beam targeting based directly on a design layout database is preferred. Beam targeting "based directly on (or in direct dependence on) a design layout database" is defined to mean that during patterning, local column controllers (local to corresponding charged particle beam columns) automatically access portions of the design layout database relevant to corresponding writing areas and interpret the design layout database directly into beam column control instructions for immediate use specifying beam deflection, beam dwell timing, beam blanking timing, beam shape and/or beam landing energy.

Direct deposition of material by a charged particle beam tool is disclosed by, for example, U.S. Pat. No. 9,453,281, which is incorporated herein by reference. Direct removal of material by a charged particle beam tool (e.g., direct etch) is disclosed by, for example, U.S. Pat. No. 9,466,464, which is incorporated herein by reference. Direct modification of material by a charged particle beam tool is disclosed by, for example, U.S. patent application Ser. No. 14/980,884, which is incorporated herein by reference. Systems, methods and tools for etching cut features and depositing pattern material into said cut features within a single pass is disclosed by, for example, U.S. patent application Ser. No. 15/171,922, which is incorporated herein by reference. Direct deposition, subtraction and modification are also collectively called "direct writing", which generally refers to prompt effect on substrate or substrate surface material as a direct result of affect (on substrate or substrate surface material, or on material adsorbed by the substrate surface) by a charged particle beam. That is, pattern can be directly etched into or deposited onto a substrate, and implantation can be performed directly using beams or by knock-on of adsorbed injected gas, using charged particle beams and without using resist or masks.

Line patterns can be written by an optical lithography system, followed by other process steps to increase the density of lines on the substrate. Cut patterns can be written by e-beam lithography. Such use of e-beam lithography (which can also write via holes and contact holes) is also called complementary e-beam lithography, or CEBL. The combination of the line-forming process followed by line-cuts written with CEBL to pattern a substrate layer is called complementary lithography. Optical masks for use in complementary lithography can be made without any information about cuts to be made using CEBL. CEBL generally uses only the cut database to designate substrate locations for cuts.

As used herein, "writing" (or "patterning") a substrate refers to any process which expresses specified pattern in or on the substrate (including material deposited on the substrate surface), expressed through any physical or chemical property of said substrate or deposited material. With respect to charged particle beams 204 targeted in direct dependence on a design layout database, "writing" includes, for example, "direct material subtraction" (direct etch), "direct material addition" (direct deposition), "direct ALE" (direct atomic layer etch) and "direct ALD" (direct atomic layer deposition), "direct material modification", CEBL, and other techniques that do or do not use resist and resist-related processes.

Charged particle beam systems comprising one or more charged particle beams can be used to personalize IC's (preferably each IC in a production run) using electron beam direct writing, CEBL, direct etch, direct deposition, or other IC pattern-writing techniques. Commercially reasonable throughput can be achieved without limiting writing to a fixed pattern.

Preferably, a charged-particle beam processing system personalizes each functional block of an IC using an IC-specific design layout database that changes from IC to IC and can be customized for available portions of the IC (e.g., for each functional block). Typically, this is accomplished by selectively editing (filling or cutting) vias to embed SED used to generate unique encryption keys. A static design layout database can be used to write features intended to be constant across a group of ICs. Charged particle beam columns can be used to write chip-specific information to a wafer with throughput sufficient for volume production. Selected holes and/or cuts (for example, a single cut feature per bit), designated in advance or calculated by the writing tool on the fly from data to be written, can be combined with static design information to implement chip-specific non-volatile data.

Writing SED to implement obfuscation of embedded keys (or other IC-specific data) and/or micro-segmentation using direct writing and/or CEBL is "minimally invasive". That is, writing SED does not disrupt an established fab process and requires no changes to other process steps.

Preferably, SED is written using direct writing.

As disclosed by, for example, U.S. patent application Ser. No. 15/293,090, charged particle beam tools can be used to write secure embedded data such that knowledge of values of said data can be effectively, permanently and securely restricted to a select set of persons, entities or systems, or deleted entirely. Encryption-based security can be maintained end-to-end during the IC-specific data fabrication process, from hardware-level security protecting generation of the values to be written as IC-specific data, to local controllers driving charged particle beam columns to perform patterning, to secure tools used to inspect patterns implementing IC-specific data as written. These protections reinforce the hardware-based root-of-trust disclosed herein, and anchor that root-of-trust in the manufacturing process.

Use of charged particle beam tools and systems to implement micro-segmentation as well as obfuscation of IC-specific write locations of IC-specific data avoids having to manufacture a multiplicity of costly masks for each layer of each block of each chip that contains, or the design of which is affected by, IC-specific data. Charged particle beam tools used to implement embodiments disclosed herein preferably comprise arrays of charged-particle beam columns, individual columns projecting individual separately-controlled beams, as disclosed in (for example) U.S. Pat. No. 9,466, 463. The speed of this massively parallel writing approach enables writing of stronger long-word encryption keys (e.g., keys of length 512 bits, 1024 bits, or more) to resist computing attacks from sophisticated (e.g., state-sponsored) actors, including actors using potential future attack technologies such as quantum computing.

Typically, hardware-based encryption keys as used at instruction execution time are generated using an algorithm applied to stored data to produce a "key'" (key prime), which is used in place of the stored key. "Encryption key", as used herein, refers to a key or a corresponding key', as appropriate and as will be understood by those of ordinary skill in the art of hardware-based encryption. Methods used to write key values can also be used to write additional values and/or details of circuits to be used to calculate key' values.

The speed of a hardware-embedded, long-word encryption engine further enables more robust, asymmetric encryption using key pairs: a public key which is widely distributed and a private key which is (preferably) never distributed. For example, suppose that CPU block1 is ready to send a private message (e.g., the location of partially processed data in cache memory) to CPU block2 (e.g., for further processing). CPU block1 accesses the readily available (e.g., locally stored) public key of CPU block2. Then, CPU block1 uses the public key of CPU block2 to encrypt the message so that only CPU block2 can receive it. Then, CPU block2 uses its private key to decrypt the message. Private keys are preferably accessible only by the logic block(s) authorized to use said keys.

The speed of a hardware-embedded, long-word encryption engine further enables robust digital authentication. For example, suppose that CPU block1 is required to authenticate itself as the source of the message previously sent to CPU block2. CPU block1 sends an authentication message using its private key. CPU block2 decrypts the message using the public key of CPU block1. Secure intra-chip hardware micro-segmentation enables digital authentication, simplified key distribution, and long-term hardware-embedded encryption using encryption keys that are unique per IC (and in some embodiments, per functional block). Various procedures for authentication are available using locally stored cryptographic keys and/or unique identifiers (e.g., a transport layer security handshake), as will be understood by one of ordinary skill in the art of cryptography.

FIG. 1 schematically shows an example of a circuit that can be used to implement Secure Embedded Data using IC-specific locations written by a charged particle beam tool 100. The circuit of FIG. 1, as well as use of a charged particle beam tool to write chip-specific SED by writing IC-specific locations that are securely selectable by the tool, with access to unencrypted information about locations written to implement SED prevented, and access to encrypted information about such locations restricted, are disclosed by U.S. patent application Ser. No. 15/260,987. Use of an intra-IC hardware-based encryption-secured data path from initial generation of information specifying locations to be written to implement SED through writing and inspection is disclosed by U.S. patent application Ser. No. 15/293,090.

FIG. 1 comprises power rail $V_{DD}$ connected to interconnect line 102 and power rail $V_{SS}$ connected to interconnect line 104; $V_{HI}$ 106 and $V_{LO}$ 108; potential write locations for contact holes 110 and 112 (implementing IC-specific data); Metal-1 lines 114, 116 and 118; Metal-2 lines 120 and 122; and contact holes 124, 126, 128, 130, 132, 134, 136 and 138. An NMOS transistor is formed by the intersection of diffusion layer region 140 and gate electrode layer region 142. A PMOS transistor is formed by the intersection of diffusion layer region 144 and gate electrode layer region 142. In this example, $V_{DD}$ 102 and $V_{HI}$ 106 correspond to logical "1", and $V_{SS}$ 104 and $V_{LO}$ 108 correspond to logical "0".

If potential contact hole 110 is written, then when $V_{HI}$ is high, a channel will form through which current can pass between the source and drain of the NMOS transistor, connecting lines 116 and 118 (output) to $V_{SS}$ 104. If potential contact hole 112 is written, then when $V_{LO}$ is low, a channel will form through which current can pass between the source and drain of the PMOS transistor, connecting lines 116 and 118 (output) to $V_{DD}$ 102. Therefore, circuit 100 functions as an inverter (logical NOT) programmable by writing one or the other of two contact holes 110, 112 using one or more charged particle beams. Permanently connecting $V_{HI}$ 106 (logical "1") using contact hole 110 results in a permanent output of $V_{SS}$ 104 (a stored logical "0"), and permanently connecting $V_{LO}$ 108 using contact hole 112 results in a permanent output of $V_{DD}$ 102 (a stored logical "1").

As used herein, an "SED cell" is the smallest circuit (or circuit portion) which, by itself, permanently stores in interconnects and (with power, ground, and other necessary inputs, if any) outputs an SED bit or (if smaller portions of the circuit cannot separately and independently output individual bits, as in some multistate memories) group of SED bits. The circuit shown in FIG. 1 is an example of an SED cell.

Figure 2:
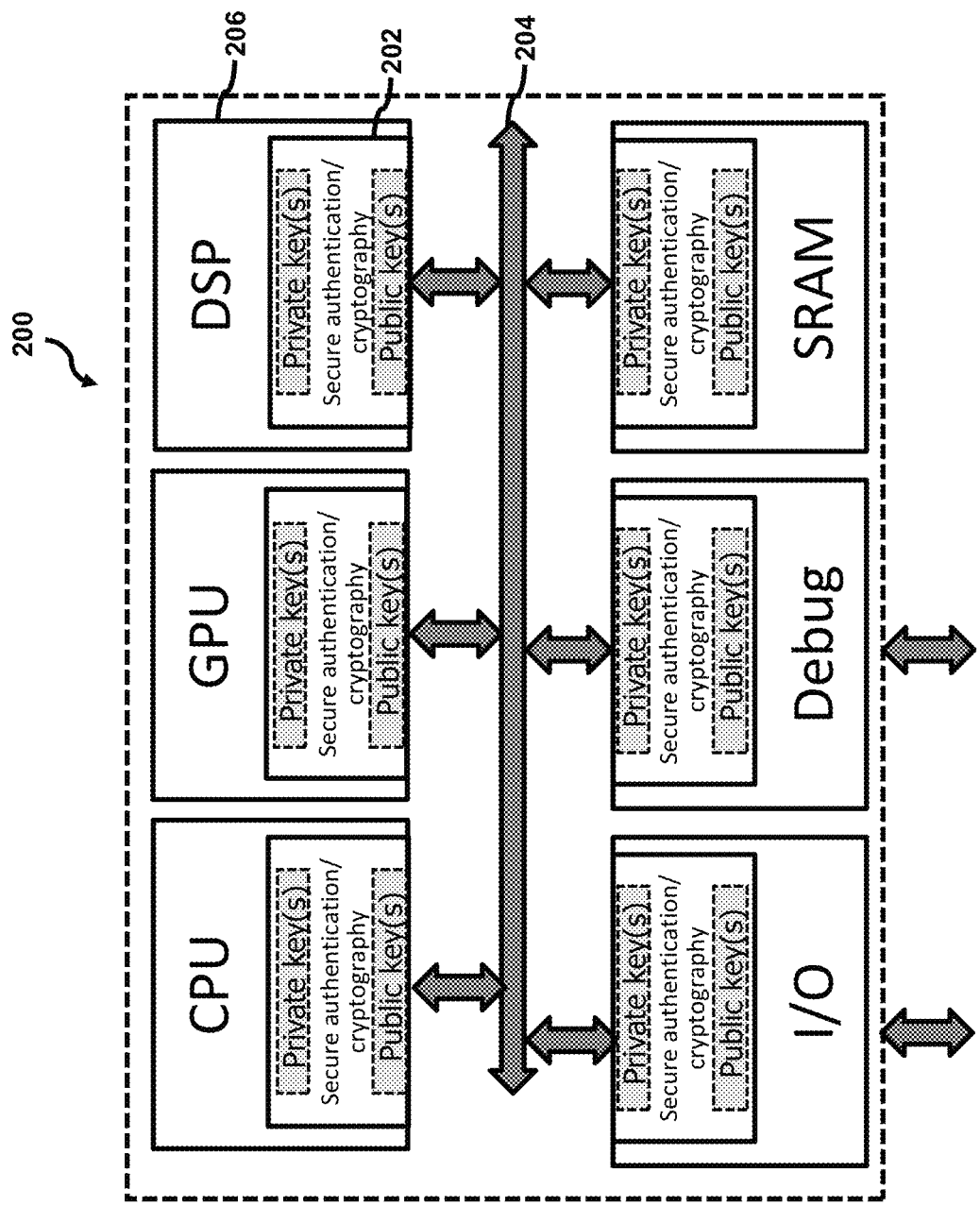
FIG. 2 schematically shows an example of an IC using secure hardware multi-core segmentation.

FIG. 2 schematically shows an example of a System-on-a-Chip (SoC) 200 using SED-based micro-segmentation. As shown, cryptography blocks 202, which can be configured to perform encryption/decryption and/or authentication, gate access to execution of messages transmitted over a bus 204 to a functional block 206 (i.e., messages not originating within the functional block 206).

"Micro-segmentation", as used herein, refers to use of hardware-based encryption to encrypt messages between functional blocks 206 on a substrate-borne device, using encryption keys stored in SED such that said encryption keys (and, preferably, unencrypted messages) are only accessible by the logic block(s) authorized to use said keys, avoiding transmission of said keys (and, preferably, unencrypted messages) over a bus 204. This helps prevent, for example, man-in-the-middle attacks, attacks by direct electrical access to busses, and other attacks. Further, it enables message authentication: an authenticated message is generated using an encryption key (such as a key unique to a particular functional block) and can only be decrypted using an appropriate decryption key corresponding to the encrypting message source, meaning that accurate decryption of the message guarantees that the message came from the source identified with the message, unless the encryption key was compromised.

Preferably, if asymmetric encryption is used, individual private keys correspond to individual functional blocks 206 and are accessible only by corresponding individual functional blocks 206. (Functional blocks in an IC can have the same private/public key pair, or some or all can have their own unique private/public key pair(s).) Public keys can be stored within cryptography blocks 202 located within or proximately to potential recipient blocks (e.g., of each functional block).

Preferably, message traffic between functional blocks 206 or otherwise travelling over a bus 204 to a functional block 206 is encrypted and/or authenticated to prevent unwanted third party access or compromise of functional block utility.

When an encrypted and/or authenticated message is received at a cryptography block 202 from the bus 204, the cryptography block 202 accesses a decryption key corresponding to the message; the decryption key or SED used to generate the key is stored locally to the functional block 206 (the key preferably does not travel over the bus 204). The cryptography block 202 then attempts to use the decryption key to decrypt the message and/or an associated authentication package. If a message was not encrypted using the expected encryption key (the encryption key corresponding to the sending functional block identified by or with the message), attempts at decryption and/or authorization by a receiving functional block will result in gibberish. If the message or authentication package are not properly decrypted, the message is denied access to the functional block 206. If decryption is fully successful, then the message receives access to the functional block 206 (execution, memory access or other appropriate functionality). Messages that fail decryption and/or authorization can, for example, be discarded or sequestered for threat analysis, trigger a defined system response, or otherwise result in the functional block and/or the IC as a whole protecting itself against the unauthorized message.

FIG. 3 shows an example of an SoC 300 using SED-based multi-core micro-segmentation. Individual functional blocks 206 often comprise multiple processing cores 302. Functional blocks 206 can also include core-local cache memories, which can be dedicated (and local) to and accessible only by individual cores (L1 cache 304), or groups (L2 cache 306) or all (L3 cache 308) of the core(s) 302 within a functional block 206.

Cryptography blocks 202 can be used to gate access to some or all cores 308 within a functional block 206, and to some or all memory levels (e.g., L1 cache 304, L2 cache 306 and/or L3 cache 308).

FIG. 4 schematically shows an example of an IC 400 using SED-based sub-segmented micro-segmentation. Functional blocks 206 can be divided into multiple encryption-gated portions. For example, a multi-core functional block 206 can be divided ("sub-segmented") so that individual cores 308 or groups of cores 308 within the functional block 206 have their own respective cryptography blocks 202. Messages from one sub-segmented portion of a functional block 206 to another sub-segmented portion of a functional block 206 can then be gated by the recipient's cryptography block 202. Memory 402 can also be divided into multiple memory blocks 404, with different memory blocks 404 having their own cryptography block 202. Sub-segmentation can be used to enforce hardware-defined limits based on application, user, system or process identity, e.g., for profile and other permissions enforcement that is secure at a hardware level. Sub-segmentation can also be used to encrypt portions of memory such that they are only readable by the encrypting sub-segment, e.g., to prevent data access or leakage; and to validate firmware within corresponding processing blocks.

Figure 5:
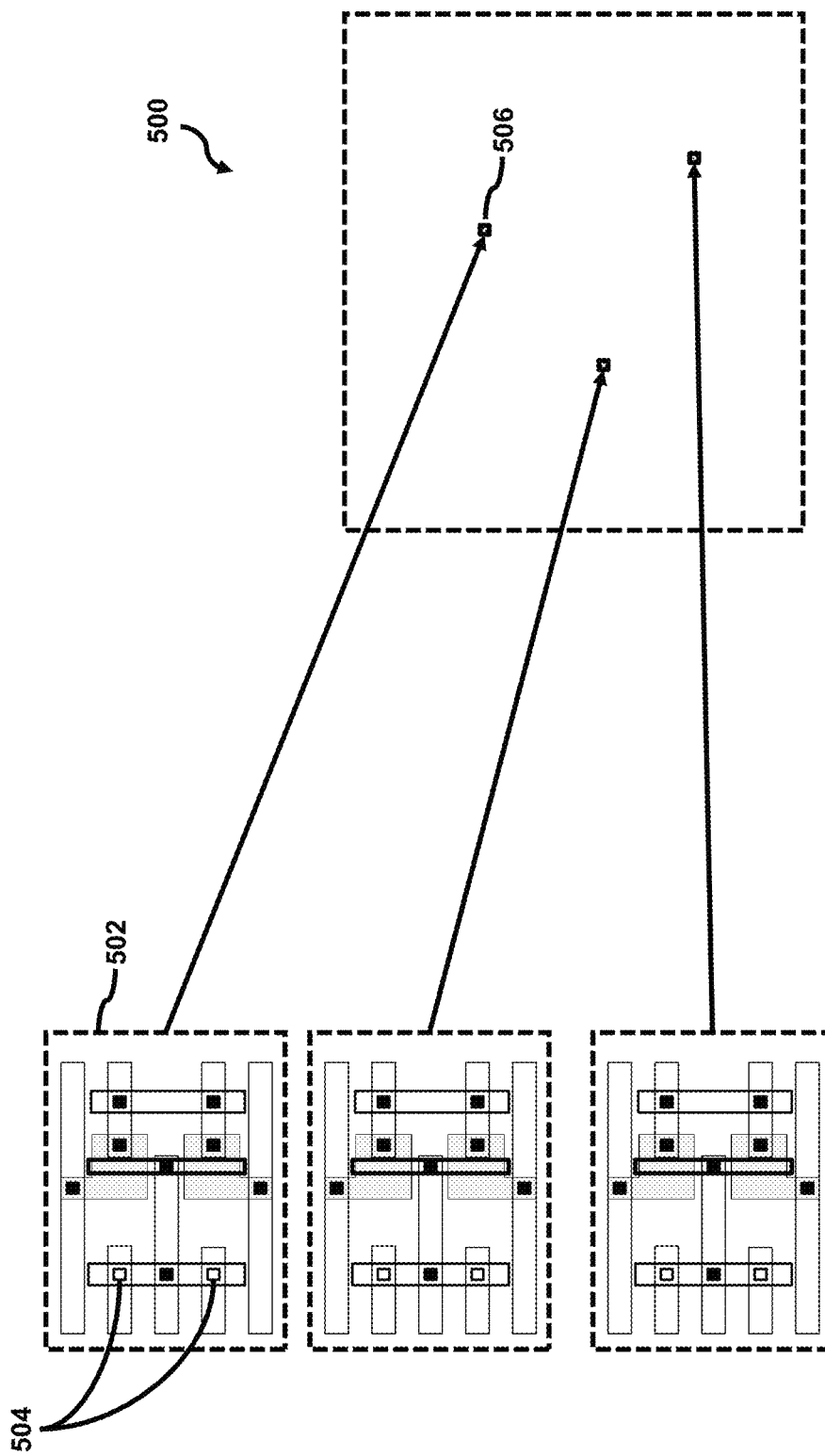
FIG. 5 schematically shows an example of IC-specific randomized location of multiple circuits storing secure embedded data.

FIG. 5 schematically shows an example of SED cells unpredictably located on an IC 500. As shown in FIG. 5, a direct writing charged particle beam processing system such as a Direct Electron Writer (DEW, which uses electrostatically deflected e-beam micro-columns performing direct writing to write pattern to a substrate) can distribute different IC-specific portions of encryption keys across different IC locations (x,y) and different layers within a set of predefined potential locations of SED cells. That is, a DEW can write SED cells 502 (e.g., comprising static-design circuit portions designed to support storage of IC-specific data, with IC-specific write locations 504 instantiating IC-specific data) to different (x,y) locations and different process layers (e.g., different via N and/or metal N layers) on different ICs 500.

Preferably, write locations for SED cells 502 are unpredictable. "Unpredictable" SED cell locations 506 are defined as locations selected such that the set of SED cell locations 506 as written to a particular IC 500 cannot be predicted from knowledge of SED cell locations 506 and other fabrication information for an arbitrarily large number of other ICs 500. Preferably, knowledge of an algorithm used to generate unpredictable locations does not enable prediction of SED cell locations 506 for a particular IC 500.

Write locations of one or more SED cells 502 can be made unpredictable by, for example, avoiding regular patterns (patterns typical to memory design, or patterns in general) in placement of fixed or potential locations of SED cells 502; and/or randomizing SED cell locations 506 within (all or part of) an allocated IC 500 surface area budget. Randomizing SED cell locations 506 can comprise, for example, randomizing which designated potential location (e.g., designated in the design layout database) a particular SED cell 502 is located in on a particular IC 500.

Preferably, portions of the design layout database containing potential SED cell locations 506 are kept encrypted when not promptly required for writing and/or inspection. Knowledge of potential SED cell locations 506 is preferably restricted, e.g., to the corresponding design team (or can be avoided entirely, if a set of potential SED cell locations 506 is randomly generated during or after automatic layout).

Selection of which of various potential locations an SED cell 502 will be written to on a particular IC 500 can be treated similarly to selection of which potential write locations (e.g., within SED cells 502) will be written on a particular IC 500. That is, the flexibility of a DEW enables use of hardware-based encryption security to protect actual SED cell write locations 506 (generated using, e.g., randomization or other algorithm or selection by a customer) throughout fabrication using, for example, the techniques disclosed in U.S. patent application Ser. No. 15/293,090 for maintaining secrecy of IC-specific write locations, including data path encryption of SED values and related IC-specific locations from initial value generation through writing and inspection and beyond.

A charged particle beam processing system can randomize the (x,y) locations and the process layers used to store encryption keys (i.e., the locations and layers used to write IC-specifically located SED cells 502 storing IC-specific bits comprising or used to generate said keys or other IC-specific data) across a functional block 206 in an IC 500, and can do so differently per IC 500 and per functional block 206 in an IC 500. This is enabled by, for example, a charged particle beam system's ability to write pattern without using a mask, and in direct dependence on a design layout database.

Positional distribution of encryption keys written in interconnects on an IC 500 increases the level of hardware-based encryption security by making it much more difficult for attackers to extract key values. This can contribute significantly to thwarting attempts to compromise device security via direct physical, optical and other imaging or side-channel attacks, and/or via electronic access to the device's internal components (e.g., using reverse engineering by de-capsulation of the device package). Unpredictably distributing SED-storing cells 502 across an IC 500 hardens that IC 500 against attacks by hindering attackers from locating, detecting, extracting or changing key values.

It will be understood by those of ordinary skill in the arts of hardware-based encryption that "prevention" of device compromise generally refers to raising the time and other resource costs of device compromise past the point where said cost exceeds any benefit to be gained, or past the capabilities of anticipated adverse actors.

Figure 6:
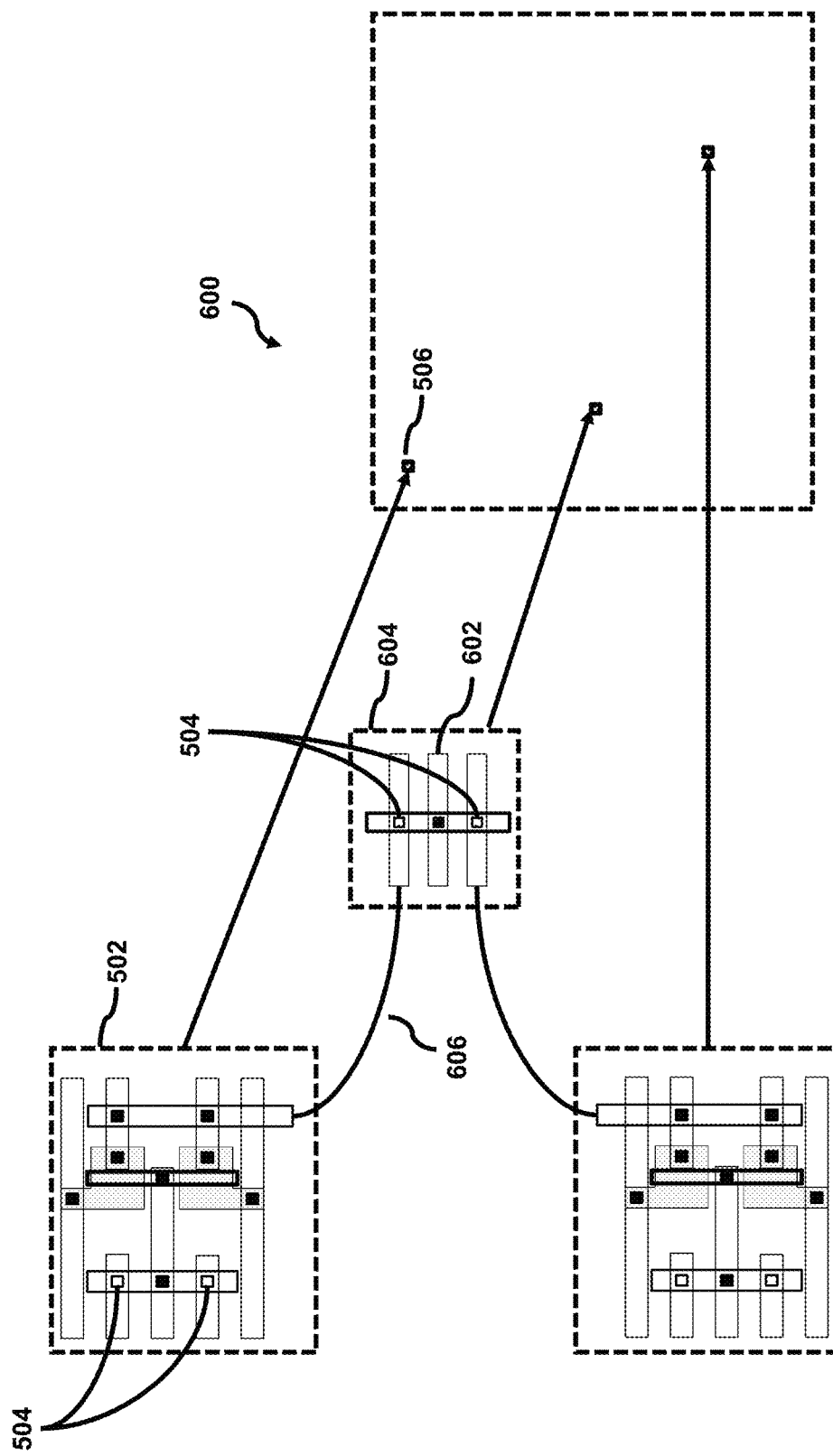
FIG. 6 schematically shows an example of an IC-specific programmable switch selecting outputs of multiple circuits storing secure embedded data.

FIG. 6 shows an example of selecting IC-specific data using IC-specific write locations on an IC 600. As shown in FIG. 5, which of two SED cells 502 determines the contents of a particular data line 602 can be controlled by which of one or more IC-specific write locations 504 is actually written. For example, this can be controlled using a switch 604 to which the output lines of the SED cells 502 are connected 606, and in which the output data line 602 is controlled by writing an IC-specific write location 504.

More SED cells 502 can be written than required to produce IC-specific values (e.g., as decoys), and IC-specific switching can be used to determine which SED cell outputs 502 are used to generate IC-specific values (e.g., encryption keys or other secure values). IC-specific switching can also be used to determine which SED cell 502 outputs are used to generate which IC-specific values, or to determine other IC-specific details of processing for SED cell 502 outputs (e.g., changing key generation algorithms in IC-specific ways). IC-specific switch 604 control over data lines 602 carrying outputs of SED cells 502 can be used to add a layer of complexity to obfuscation of the positions in which particular cells 502 determining values of particular IC-specific values are located. This adds time and resource cost to attempts to compromise security of IC device function using direct physical access to the IC package interior.

Figure 7:
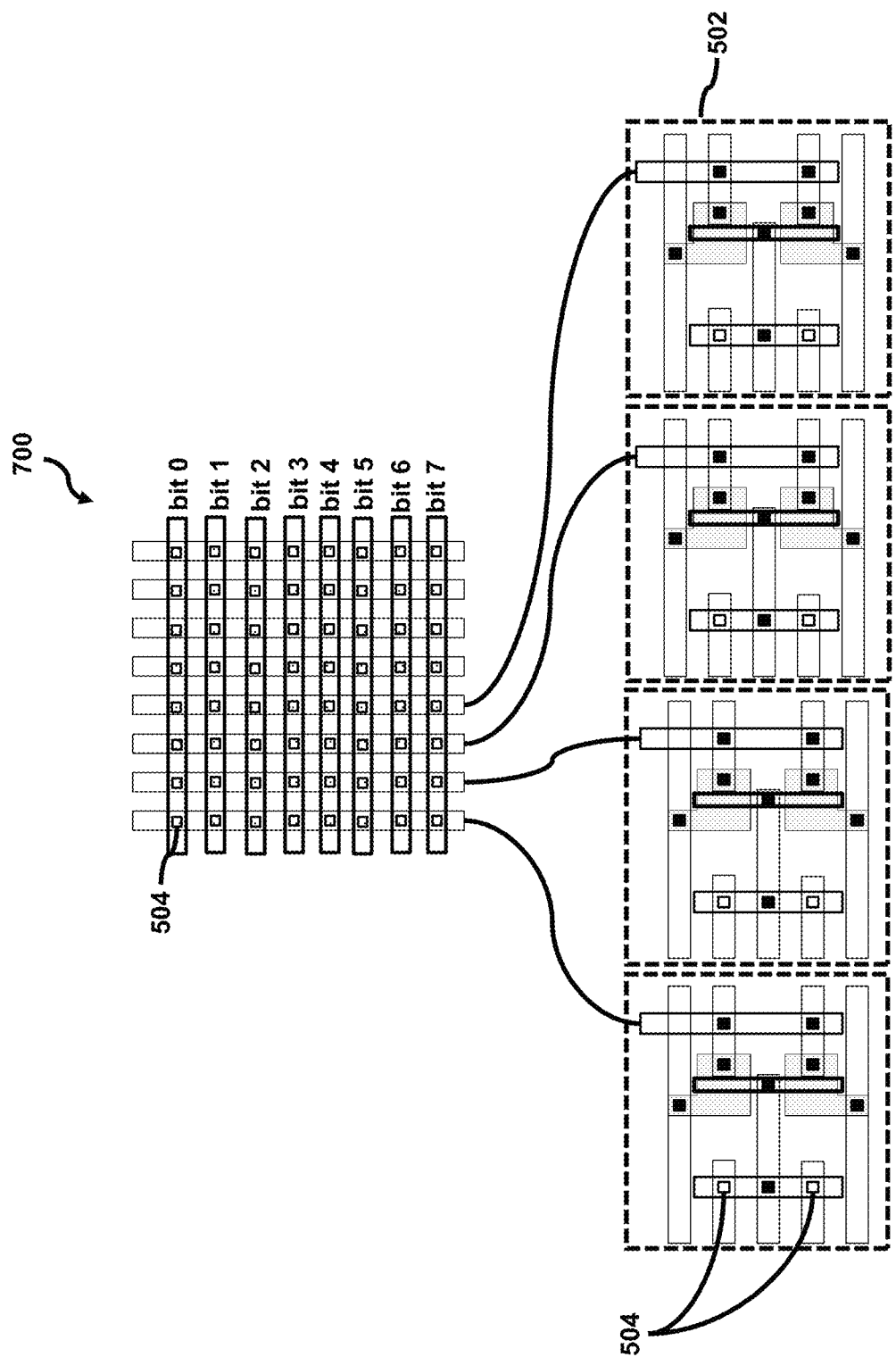
FIG. 7 schematically shows an example of an IC-specific programmable array switching outputs of multiple circuits storing secure embedded data.

FIG. 7 shows an example of selecting IC-specific data using IC-specific write locations in a programmable array 700. A programmable array 700 programmed using IC-specific write locations 504, as shown in FIG. 7, can be used to perform IC-specific switching. A programmable array 700 can be used to, for example, select an ordering (e.g., most-to least-significant bits, or vice versa) of SED cell 502 outputs for use in generating a key or other secure value. The programmable array 700 can also be used to, for example, select a chip-specific ordering of SED cell 502 outputs to obfuscate which SED cell 502 corresponds to which bit of a key. The programmable array 700, along with the potential write locations used to program the array 700, can be physically scattered across an IC layout.

The layer(s) in which an array 700 is programmed is independent from the layer(s) in which SED cells 502 are programmed. For example, IC-specific locations 504 in SED cells 502 can be written in via-1, while IC-specific locations in a programmable array 700 are written in via-1 or via-2 (or in metal-1 or metal-2, such as if the array 700 shown in FIG. 7 were redesigned to be programmed using lines rather than vias to designate IC-specific functionality).

Those of ordinary skill in the arts of IC design will understand that arrays and other formats of non-volatile (because it is expressed in interconnects) switching which are programmable during fabrication, and which can be rapidly, securely and differently programmed for (some or) each IC in a production run, can be adapted to a variety of applications other than those expressly described herein.

Use of IC-specific programmable arrays to manipulate SED-stored data adds an additional layer of complexity to obfuscation of the relationship between particular SED cells and encryption keys and other secure data stored by or generated using SED cells, thereby adding time and resource cost to attempts to compromise security of IC device function using direct physical access to the IC package interior.

Figures 8A, 8B:
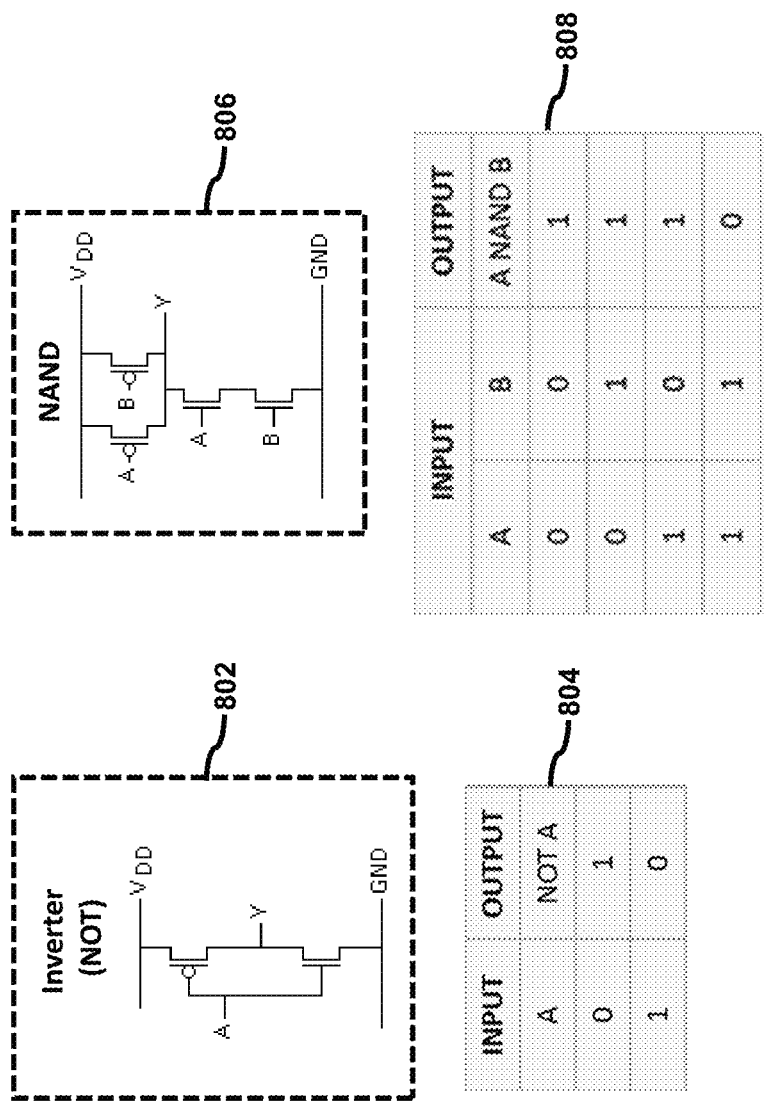
FIG. 8A shows an example of a transistor-level diagram of a circuit implementing logical NOT (an inverter) and corresponding truth table.
FIG. 8B shows an example of a transistor-level diagram of a circuit implementing logical NAND and corresponding truth table.
Figures 8C, 8D:
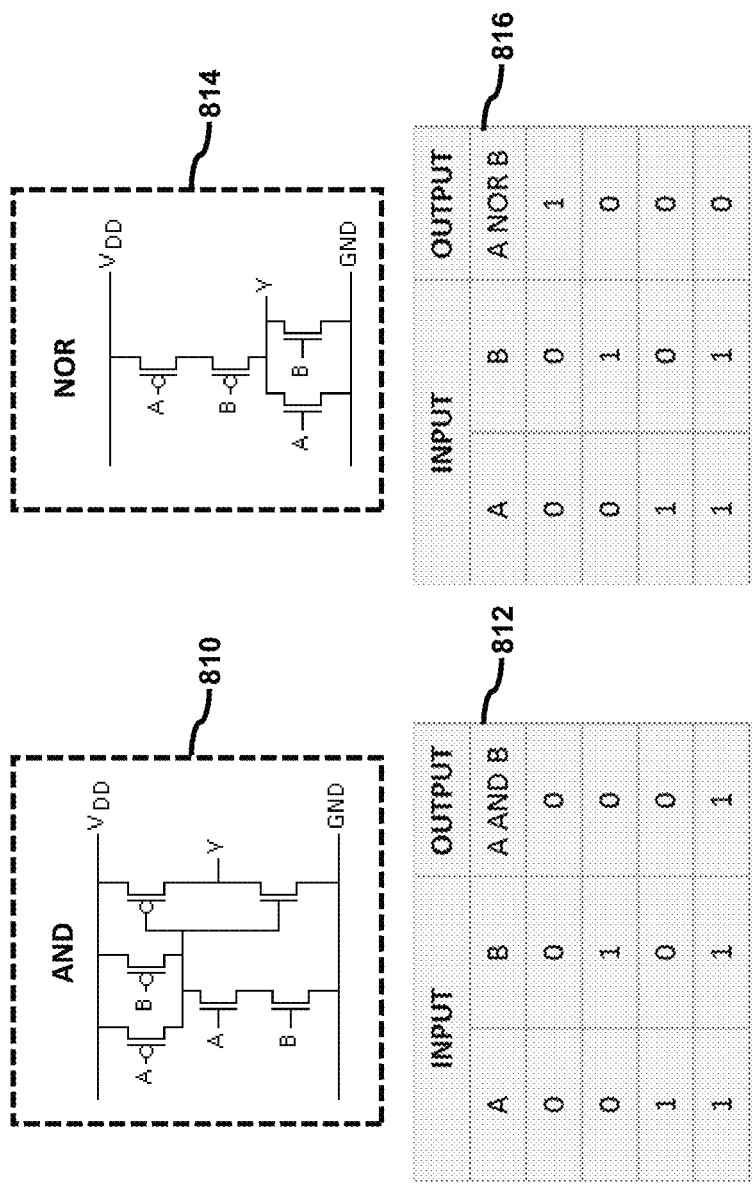
FIG. 8C shows an example of a transistor-level diagram of a circuit implementing logical AND and corresponding truth table.
FIG. 8D shows an example of a transistor-level diagram of a circuit implementing logical NOR and corresponding truth table.

FIG. 8A shows an example of a transistor-level diagram of a circuit implementing logical NOT 802 (an inverter) and corresponding truth table 804. FIG. 8B shows an example of a transistor-level diagram of a circuit implementing logical NAND 806 and corresponding truth table 808. FIG. 8C shows an example of a transistor-level diagram of a circuit implementing logical AND 810 and corresponding truth table 812. FIG. 8D shows an example of a transistor-level diagram of a circuit implementing logical NOR 814 and corresponding truth table 816. FIGS. 8A, 8B, 8C and 8D are examples of logical operator circuits which can be used as SED cells by connecting inputs of the logical operators to $V_{DD}$ and/or $V_{SS}$. That is, said logical operator circuits can be made to store and permanently output selected values by connecting their inputs to $V_{DD}$ and/or $V_{SS}$ (or $V_{HI}$ and/or $V_{LO}$ or other output-determinative voltages). This can be done with other functional circuits comprising a device, as well—generally, a functional circuit with an output determined by an input can be made to store and permanently output selected values by connecting one or more of said inputs to $V_{DD}$ and/or $V_{SS}$ (or $V_{HI}$ and/or $V_{LO}$), and can thereby be used as an SED cell.

Figure 9:
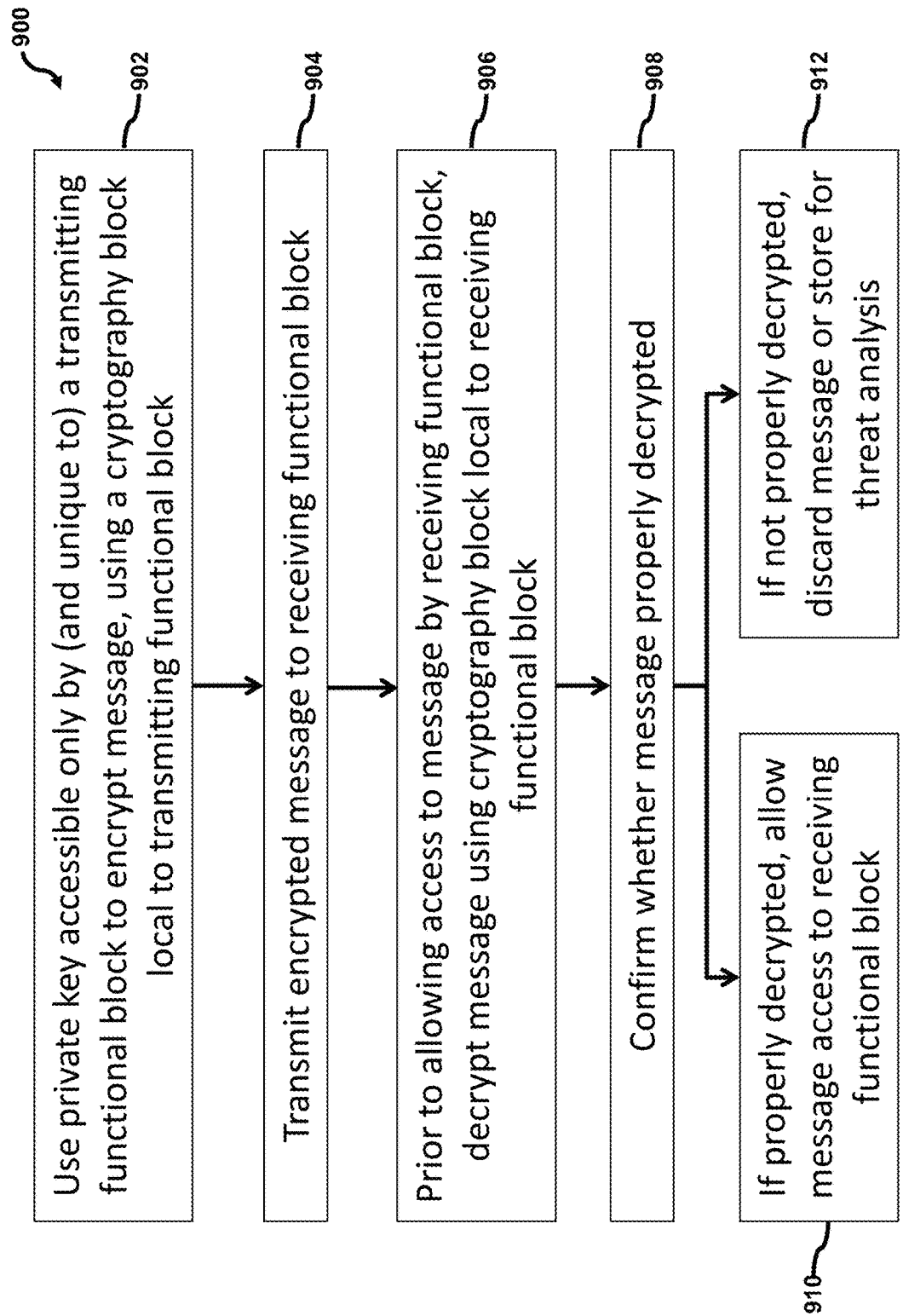
FIG. 9 shows an example of a process for transmitting messages in a hardware-based micro-segmentation regime.

FIG. 9 shows an example of a process for transmitting messages in a hardware-based micro-segmentation regime 900. Using a private key that is only accessible by (and unique to) a cryptography block 202 local to a transmitting functional block 206, a message is encrypted in step 902. The message is then transmitted (e.g., through a bus) to a receiving functional block 206 in step 904. Prior to allowing access by the message to the receiving functional block 206, the cryptography block of the receiving functional block 206 attempts to decrypt the message using the public key corresponding to the transmitting functional block 202 in step 906. Proper decryption of the message is confirmed 908. If the message is properly decrypted, the message is allowed access to (e.g., instruction execution by) the receiving functional block 202 in step 910. Otherwise, the message is discarded 912 (or can be stored for threat analysis).

According to some but not necessarily all embodiments, there is provided: A processing unit on a substrate, comprising: one or more functional blocks, ones of said functional blocks discretely capable of executing instructions and comprising at least one cryptographic key unique to said processing unit, said functional blocks configured to use said cryptographic key to encrypt and send messages to receiving ones of said functional blocks and/or to devices external to said processing unit, said functional blocks configured not to execute messages that are not correctly decrypted by said cryptographic key; and a non-volatile memory storing key data, said key data comprising or configured to be used to generate said cryptographic key, values of bits stored by said non-volatile memory determined using interconnects, wherein same ones of said functional blocks on multiple distinct ICs corresponding to a same static portion of a design layout database store one or more same-value same-digit bits of said key data in different physical locations.

According to some but not necessarily all embodiments, there is provided: A processing unit on a substrate, comprising: one or more functional blocks, ones of said functional blocks discretely capable of executing instructions and comprising at least one cryptographic key unique to said processing unit, said functional blocks configured to use said cryptographic key to encrypt and send messages to receiving ones of said functional blocks and/or to devices external to said processing unit, said functional blocks configured not to execute messages that are not correctly decrypted by said cryptographic key; a non-volatile memory, values of bits stored by said non-volatile memory determined using interconnects, multiple stored bits in said memory being determined by multiple first IC-specific written locations, individual bits of said cryptographic key being at least partially determined by said stored bits; and multiple second IC-specific written locations configured to at least partially determine how said stored bits are used to generate said key.

According to some but not necessarily all embodiments, there is provided: A processing unit on a substrate, comprising: one or more functional blocks, ones of said functional blocks discretely capable of executing instructions and comprising at least one cryptographic key unique to said processing unit, said functional blocks configured to use said cryptographic key to encrypt and send messages to receiving ones of said functional blocks and/or to devices external to said processing unit, said functional blocks configured not to execute messages that are not correctly decrypted by said cryptographic key; and a non-volatile memory storing key data, said key data comprising or configured to be used to generate said cryptographic key, values of bits stored by said non-volatile memory determined using interconnects written at IC-specific locations, wherein same ones of said functional blocks on multiple distinct ICs corresponding to a same static portion of a design layout database store one or more same-value same-digit bits of said key data in different regions of said functional blocks.

According to some but not necessarily all embodiments, there is provided: A processing unit on a substrate, comprising: one or more functional blocks, ones of said functional blocks discretely capable of executing instructions and comprising at least one cryptographic key unique to said processing unit, said functional blocks configured to use said cryptographic key to encrypt and send messages to receiving ones of said functional blocks and/or to devices external to said processing unit, said functional blocks configured not to execute messages that are not correctly decrypted by said cryptographic key; and a non-volatile memory storing key data comprising multiple bits, said key data comprising or configured to be used to generate said cryptographic key, different bits of said key data stored by differently-functioning functional circuits, values of said bits being determined by interconnects located in IC-specific write locations connecting inputs of said functional circuits to corresponding output-determining voltages.

According to some but not necessarily all embodiments, there is provided: A processing unit on a substrate, comprising: multiple functional blocks, ones of said functional blocks discretely capable of executing instructions, multiple ones of said functional blocks comprising a cryptographic key uniquely identified with said functional block, said functional blocks configured to encrypt and send messages to receiving ones of said functional blocks using said cryptographic key uniquely identified with said sending functional block or said receiving functional block, said functional blocks configured not to execute messages that are not correctly decrypted by said cryptographic key; and a non-volatile memory storing key data, said key data comprising or configured to be used to generate said cryptographic key, values of bits stored by said non-volatile memory determined using interconnects written at IC-specific locations.

According to some but not necessarily all embodiments, there is provided: A processing unit on a substrate, comprising: one or more functional blocks, ones of said functional blocks discretely capable of executing instructions and comprising at least one cryptographic key unique to said processing unit, said functional blocks configured to use said cryptographic key to encrypt and send messages to receiving ones of said functional blocks and/or to devices external to said processing unit, said functional blocks configured not to execute messages that are not correctly decrypted by said cryptographic key; and a non-volatile memory storing key data, said key data comprising or configured to be used to generate said cryptographic key, values of bits stored by said non-volatile memory determined using interconnects written at IC-specific locations, wherein said locations, and/or a manner in which said bits are used to generate said key, are obfuscated.

According to some but not necessarily all embodiments, there is provided: A processing unit on a substrate, comprising: a non-volatile memory storing a sensitive data, values of bits stored by said non-volatile memory determined using interconnects written at IC-specific locations; and one or more functional blocks, ones of said functional blocks discretely capable of executing instructions, said functional blocks configured to use said sensitive data during at least one of boot up, processing, and communication among said functional blocks and/or between said functional blocks and an external device; wherein said locations, and/or a manner in which said bits are used to generate said sensitive data, are obfuscated.

According to some but not necessarily all embodiments, there is provided: Methods, systems and devices for using different encryption keys written into interconnects of different functional blocks in different integrated circuits to securely encrypt and authenticate firmware, data, instructions and other messages transmitted among said functional blocks; and methods, systems and devices to obfuscate encryption keys to significantly increase the time and resources required to compromise those keys, ensuring encrypted data is only decrypted by authorized functional blocks, applications or users. Unique keys, small enough not to impact substrate surface area available for other device functions, can be written by charged particle beams such that multiple (or each of) functional blocks has a corresponding key unique within an IC and across a line of ICs and so that access to said keys is as limited (or nonexistent) as desired. Circuits embodying key bits can also be distributed throughout ICs and across layers, uniquely to individual functional blocks in individual ICs, to obfuscate patterns implementing keys and thereby raising time and resource cost to reverse engineer keys to prohibitive levels.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Herein, for functional blocks or functional blocks comprising discrete processing units (e.g., cores), description of a functional block or processing unit as discretely capable of executing instructions or capable of discretely executing instructions does not itself require (though it may be a feature of some embodiments) that the functional block is restricted from participating in an execution pipeline or a parallel processing schema or another distributed-execution process with other functional blocks and/or processing units.

In some embodiments, only some (or one) functional blocks on an IC are personalized using SED.

In some embodiments, a public key (or keys) unique to a first IC can be written to other ICs intended to communicate with, or be incorporated into the same system as, the first IC.

In some embodiments, arrangements of switches other than separate individual switches and other than rectangular, tightly packed arrays can be used to determine which SED-stored bit is used to generate which bit(s) of an IC-specific key (or other IC-specific data), and/or can be used to determine how such bit(s) of the IC-specific key are generated. For example, an array of switches arranged as other than a rectangular block.

In some embodiments, the locations of particular SED cells used to store IC-specific data, taken together, are unique to the respective IC.

In some embodiments, a stored instance of an asymmetric key comprises a corresponding public key, a corresponding private key, or both.

In some embodiments, a cryptographic key is unique to a group of functional blocks. In some embodiments, multiple cryptographic keys are unique to a functional block or to a group of functional blocks.

In some embodiments, cryptographic keys are symmetric. In some embodiments, cryptographic keys are asymmetric. In some embodiments, a mix of symmetric and asymmetric keys is used. Ones of ordinary skill in the art of hardware-based cryptography will understand that a variety of types of cryptographic keys and encryption/decryption hardware can be used.

In some embodiments individual functional blocks comprise individual instruction-executing cores. In some embodiments, individual functional blocks comprise groups of instruction-executing cores.

In some embodiments, a functional block comprises one or more encrypted memories and/or one or more unencrypted memories. In some embodiments, a memory is accessible only by a corresponding functional block. In some embodiments, a memory is accessible by less than all processing cores in a functional block. In some embodiments, a functional block comprises a single processing core. In some embodiments, a functional block comprises multiple processing cores.

In some embodiments, IC-specific data is written into less than all functional blocks on an IC (e.g., one or some).

In some embodiments, ones of said functional blocks store a table of encryption and decryption keys enabling said functional block to encrypt and decrypt messages capable of being correctly decrypted and encrypted (respectively) by other functional blocks with which said functional block is intended to communicate.

In some embodiments, using a public portion of a cryptographic key unique to a receiving functional block to encrypt a message restricts access to the content of said message to said receiving functional block, and using a private portion of said cryptographic key unique to a sending functional block to encrypt said message authenticates the source of said message as said sending functional block.

In some embodiments, messages from outside a memory must be correctly decrypted prior to causing a read and/or write access to said memory.

In some embodiments, ion beam columns are used instead of or in addition to e-beam columns to pattern a substrate.

In some embodiments, a functional block is a portion of an integrated circuit discretely capable of executing instructions.

In some embodiments, only some messages are encrypted. In some embodiments, only some messages are authenticated. In some embodiments, which messages to encrypt and/or authenticate is determined by type or other characteristic(s) of messages (e.g., type of instruction, specified memory range (e.g., for memory with contents designated secure or sensitive), source and/or destination, or timing) or by periodic or randomized selection of messages.

The disclosure herein refers to the use of secure intra-chip microsegmentation, as well as various obfuscatory techniques, with respect to ICs. As will be apparent to one of ordinary skill in the arts of charged particle beam substrate processing, said microsegmentation and related obfuscatory techniques can be used with respect to various substrate-borne electronic devices.

The disclosure herein refers to the use of DEWs to write ICs and other substrate-borne electronic devices. As will be apparent to one of ordinary skill in the arts of charged particle beam substrate processing, charged particle beam processing tools and systems (including direct writing tools and systems) other than a DEW can also be used.

In some embodiments, obfuscatory techniques as disclosed herein can be used with respect to IC-specific data other than encryption keys.

In some embodiments, the write locations (x,y) and/or layers used on multiple different ICs to implement the same value and same digit of a cryptographic key (or other IC-specific data) are different. "Same value" refers to the same output, e.g., a logical output of "1" or "0". "Same digit" refers to the same digit (e.g., in a numerical representation) of the key (or other IC-specific data), such as the $2^0$, $2^1$ or $2^2$ digit in a binary representation of the key (or other IC-specific data).

In some embodiments, unencrypted messages received by a functional block can be executed or otherwise accessed in a sandbox environment.

In some embodiments, randomizing SED cell locations can comprise fully randomizing location within an allocated surface area.

In some embodiments, SED cells are unpredictably located (e.g., as disclosed with respect to FIG. 5) by distributing them across a region (or an area local to a region) other than a single corresponding functional block, e.g., the IC, one or more individual cores or cache memories, or one or more sub-segments.

In some embodiments, different designs are used to implement different SED cells.

In some embodiments, functional blocks can select from a set of locally stored keys and/or cryptographic protocols for use in communication between functional blocks.

In some embodiments, keys (or other IC-specific data) are "serialized", i.e., assembled into a key or key' (or other IC-specific data).

In some embodiments, less than each functional block is gated by encryption and/or authentication. In some embodiments, less than all of a functional block is gated by encryption and/or authentication (e.g., certain cores or cache memories can be ungated). In some embodiments, not all messages are encrypted and/or authenticated. In some embodiments, whether a message is encrypted and/or authenticated depends on the type of message, its origin or destination, by a pre-selected algorithm, or by random or periodic selection.

In some embodiments, switching paradigms other than binary switches and arrays are used to determine function of and/or calculation using SED cell outputs.

In some embodiments, some (or all) cryptographic keys (or other IC-specific data) are unique to (shared by) groups of ICs. For example, a group of ICs that is intended to be built into and/or used by a system, or that is intended to communicate with each other.

In some embodiments, obfuscation is used with respect to IC-specific data that is unique to (shared by) a group of ICs, or with respect to non-IC-specific data (e.g., proprietary data) that is common to a line of ICs, to harden said ICs against reverse engineering (e.g., by decapsulation) of said data.

In some embodiments, obfuscation as disclosed herein is used to harden a confidential set of instructions (or other proprietary data), e.g., code used to boot one or more functional blocks, an IC or a system, against reverse engineering (e.g., by decapsulation). In some embodiments, such instructions are configured not to be transmitted unencrypted over an IC (or other device) bus.

In some embodiments, obfuscation as disclosed herein is used to make it more difficult to modify or otherwise interfere with function of and function affected by data stored using said obfuscation.

Additional general background, which helps to show variations and implementations, may be found in the following publications, all of which are hereby incorporated by reference: Martin Scott, "Chip Lifecycle Security—Managing Trust and Complexity", Rambus 2016; David K. Lain, "Embedding Security On-Chip in the IoT World", Semicon West, Jul. 12-14, 2016; Hugh Durden, "Increasing Security in SoC Designs with Third-Party IP", Semicon West, Jul. 12, 2016; U.S. Pat. Nos. 7,316,934; 8,832,465; 9,147,606; 6,355,994; 6,617,587; 6,734,428; 6,738,506; 6,777,675; 6,844,550; 6,872,958; 6,943,351; 6,977,375; 7,122,795; 7,227,142; 7,435,956; 7,456,402; 7,462,848; 7,786,454; 7,928,404; 7,941,237; 8,242,457; 8,384,048; 8,999,627; 8,999,628; 9,184,027; and 9,207,539.

Additional general background, which helps to show variations and implementations, as well as some features which can be implemented synergistically with the inventions claimed below, may be found in the following US patent applications. All of these applications have at least some common ownership, copendency, and inventorship with the present application, and all of them, as well as any material directly or indirectly incorporated within them, are hereby incorporated by reference: U.S. patent application Ser. No. 14/085,768; U.S. patent application Ser. No. 14/703,306; U.S. patent application Ser. No. 14/522,563; U.S. patent application Ser. No. 14/523,909; U.S. patent application Ser. No. 14/694,710; U.S. patent application Ser. No. 14/695,767; U.S. patent application Ser. No. 14/695,776; U.S. patent application Ser. No. 14/695,785; U.S. patent application Ser. No. 14/745,463; U.S. patent application Ser. No. 14/809,985; U.S. patent application Ser. No. 14/966,165; U.S. patent application Ser. No. 14/980,884; U.S. patent application Ser. No. 15/171,922; and U.S. patent application Ser. No. 15/260,987.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A processing unit on a substrate including a secure memory, comprising:

one or more functional blocks, ones of said functional blocks discretely capable of executing instructions and comprising at least one cryptographic key unique to said processing unit, said functional blocks configured to use said-cryptographic key to encrypt and send messages to receiving ones of said functional blocks and/or to devices external to said processing unit;

a non-volatile memory having multiple first interconnects written at first integrated circuit-specific (IC-specific) locations, having multiple outputs, and storing multiple stored bits, values of said stored bits determined using said first interconnects, said outputs configured to output respective ones of said values; and a cryptographic key generator having multiple second interconnects written at second IC-specific locations, and having multiple inputs coupled to respective ones of said outputs, said cryptographic key generator configured to generate said cryptographic key as a function of said inputs, said function at least partially determined by said second IC-specific locations;

wherein said first IC-specific locations and said second IC-specific locations include IC-specific (x, y) locations and/or IC-specific layers.

2. The processing unit of claim 1, wherein said cryptographic key comprises a public portion and a private portion, and wherein said private portion and said stored bits determining said cryptographic key are configured not to be transmitted unencrypted between different ones of said functional blocks.

3. The processing unit of claim 1, wherein said stored bits are stored locally to multiple ones of said functional blocks such that multiple copies of said stored bits are stored in multiple discrete locations.

4. The processing unit of claim 1, wherein which of said stored bits are used to generate which digit of said cryptographic key is configured to be determined responsive to said second interconnects.

5. The processing unit of claim 1, further comprising multiple switches, said switches being configured to determine which of said stored bits are used to generate which digit of said key responsive to said second interconnects.

6. The processing unit of claim 5, wherein said switches comprise at least one switching array.

7. The processing unit of claim 1, further comprising multiple calculation units, ones of said calculation units configured to perform a fixed set of calculations, which of said calculation units is used to generate said key using said stored bits determined responsive to said second interconnects.

8. The processing unit of claim 1, further comprising multiple switches, said switches configured to select which ones of said stored bits are used to generate said key responsive to said second interconnects.

9. The processing unit of claim 1, said stored bits at least partially determining a value of at least one IC-specific data other than said key.

10. The processing unit of claim 1, wherein which of said stored bits are used to generate which digit of said cryptographic key is configured to be determined responsive to said interconnects.

11. The processing unit of claim 1, further comprising multiple switches, said switches being configured to determine which of said stored bits are used to generate which digit of said key responsive to said interconnects.

12. The processing unit of claim 1, further comprising multiple calculation units, ones of said calculation units configured to perform a fixed set of calculations, said which of said calculation units is used to generate said key using said stored bits determined responsive to said interconnects.

13. The processing unit of claim 1, further comprising multiple switches, said switches configured to select which ones of said stored bits are used to generate said key responsive to said interconnects.

14. A processing unit on a substrate including a secure memory, comprising:
one or more functional blocks, ones of said functional blocks discretely capable of executing instructions and comprising at least one cryptographic key unique to said processing unit, said functional blocks configured to use said cryptographic key to encrypt and send messages to receiving ones of said functional blocks and/or to devices external to said processing unit; and
a non-volatile memory storing key data comprising multiple bits with values determined using multiple interconnects written at different integrated circuit-specific (IC-specific) locations, a first one of said bits stored by a first IC-specific functional circuit having a first IC-specific functionality, and a second one of said bits stored by a second IC-specific functional circuit having a second IC-specific functionality, wherein said first IC-specific functionality is different from said second IC-specific functionality;
wherein said key data comprises or is configured to be used to generate said cryptographic key; and
wherein said IC-specific locations include IC-specific (x, y) locations and/or IC-specific layers.

15. The processing unit of claim 14, wherein said first and second functional circuits are circuits implementing logical operators.

16. The processing unit of claim 15, wherein said logical operators comprise two or more of: NOT, AND, OR, NAND, NOR, or XOR.

17. The processing unit of claim 14, wherein said cryptographic key comprises a public portion and a private portion, and wherein said key data and said private portion are configured not to be transmitted unencrypted between different ones of said functional blocks.

18. The processing unit of claim 14, wherein said key data is stored locally to multiple ones of said functional blocks such that multiple copies of said key data are stored in multiple discrete locations.

19. A processing unit on a substrate including a secure memory, comprising:
one or more functional blocks, ones of said functional blocks discretely capable of executing instructions and comprising at least one cryptographic key unique to said processing unit, said functional blocks configured to use said cryptographic key to encrypt and send messages to receiving ones of said functional blocks and/or to devices external to said processing unit;
a non-volatile memory having multiple outputs and storing multiple bits, values of individual bits of said cryptographic key being at least partially determined by values of said stored bits, said outputs configured to output respective ones of said values; and
a cryptographic key generator having multiple interconnects written at different IC-specific locations, and having multiple inputs coupled to respective ones of said outputs, said cryptographic key generator configured to generate said cryptographic key as a function of said inputs, said function at least partially determined by said IC-specific locations;
wherein said IC-specific locations include IC-specific (x, y) locations and/or IC-specific layers.

* * * * *